(12) United States Patent
Talwar et al.

(10) Patent No.: US 7,275,076 B2
(45) Date of Patent: *Sep. 25, 2007

(54) MULTIPLICATION LOGIC CIRCUIT

(75) Inventors: Sunil Talwar, Warwickshire (GB); Dmitriy Rumynin, Coventry (GB)

(73) Assignee: Arithmatica Limited, Oxford (GB)

( * ) Notice: Subject to any disclaimer, the term of this patent is extended or adjusted under 35 U.S.C. 154(b) by 685 days.

This patent is subject to a terminal disclaimer.

(21) Appl. No.: 10/472,658

(22) PCT Filed: Mar. 21, 2002

(86) PCT No.: PCT/GB02/01343

§ 371 (c)(1),
(2), (4) Date: Sep. 22, 2003

(87) PCT Pub. No.: WO02/077792

PCT Pub. Date: Oct. 3, 2002

(65) Prior Publication Data

US 2004/0103135 A1    May 27, 2004

(30) Foreign Application Priority Data

Mar. 22, 2001  (GB) ................................. 0107212.3

(51) Int. Cl.
*G06F 7/52*      (2006.01)

(52) U.S. Cl. .................................................... 708/625

(58) Field of Classification Search ................ 708/626, 708/210, 625

See application file for complete search history.

(56) References Cited

U.S. PATENT DOCUMENTS

| 3,634,658 A | 1/1972 | Brown .................. 235/92 LG |
| 3,757,098 A | 9/1973 | Wright ....................... 235/175 |
| 4,399,517 A | 8/1983 | Niehaus et al. ............. 364/784 |
| 4,596,256 A | 6/1986 | Ascher et al. .............. 128/710 |
| 4,607,176 A | 8/1986 | Burrows et al. ............ 307/449 |
| 4,993,421 A | 2/1991 | Thornton .................... 128/670 |
| 5,095,457 A | 3/1992 | Jeong ........................ 364/758 |
| 5,095,547 A | 3/1992 | Kerns ............................ 2/160 |

(Continued)

FOREIGN PATENT DOCUMENTS

EP          0168650          1/1986

(Continued)

OTHER PUBLICATIONS

"Communication Pursuant to Article 96(2) EPC, for application No. EP 02 722 402.1, date mailed Jun. 6, 2005", 3 Pages.

(Continued)

*Primary Examiner*—D. H. Malzahn
(74) *Attorney, Agent, or Firm*—Schwegman, Lundberg and Woessner P.A.

(57) ABSTRACT

A multiplication logic circuit comprises array generation logic and array reduction logic. The array reduction logic comprises array reduction logic for a first level of array reduction which comprises maximal length parallel counters for reducing maximal length columns. The output of the maximal length parallel counters are then further reduced by a second level of reduction logic comprising logic circuits with asymmetric delays in order to compensate for the differential delays experienced by the outputs of the maximal length parallel counters.

23 Claims, 8 Drawing Sheets

U.S. PATENT DOCUMENTS

| | | | | |
|---|---|---|---|---|
| 5,175,862 | A | 12/1992 | Phelps et al. | 395/800 |
| 5,187,679 | A | 2/1993 | Vassiliadis et al. | 364/786 |
| 5,325,320 | A | 6/1994 | Chiu | 364/760 |
| 5,343,417 | A | 8/1994 | Flora | 364/758 |
| 5,497,342 | A | 3/1996 | Mou et al. | 364/786 |
| 5,524,082 | A | 6/1996 | Horstmann et al. | 364/489 |
| 5,701,504 | A | 12/1997 | Timko | |
| 5,964,827 | A | 10/1999 | Ngo et al. | 708/710 |
| 5,978,827 | A | 11/1999 | Ichikawa | |
| 5,995,029 | A | 11/1999 | Ryu | 341/101 |
| 6,008,668 | A | 12/1999 | Saruwatari | |
| 6,023,566 | A | 2/2000 | Belkhale et al. | 395/500.03 |
| 6,175,852 | B1 | 1/2001 | Dhong et al. | |
| 6,269,386 | B1 | 7/2001 | Siers et al. | |
| 6,344,760 | B1 | 2/2002 | Pyo | |
| 6,445,210 | B2 | 9/2002 | Nojiri | |
| 6,490,608 | B1 | 12/2002 | Zhu | 708/626 |
| 6,577,164 | B2 | 6/2003 | Tomita | |
| 6,724,223 | B2 | 4/2004 | Ichiguchi et al. | |
| 6,882,175 | B2 | 4/2005 | Motegi et al. | |
| 6,883,011 | B2 | 4/2005 | Rumynin et al. | |
| 6,938,061 | B1 | 8/2005 | Rumynin et al. | |
| 2002/0026465 | A1 | 2/2002 | Rumynin et al. | 708/210 |
| 2002/0078110 | A1 | 6/2002 | Rumynin et al. | 708/210 |
| 2003/0016055 | A1 | 1/2003 | Oodaira et al. | |
| 2004/0153490 | A1 | 8/2004 | Talwar et al. | |

FOREIGN PATENT DOCUMENTS

| | | |
|---|---|---|
| EP | 0309292 | 3/1989 |
| EP | 0442356 | 8/1991 |
| EP | 0741354 | 11/1996 |
| FR | 2475250 | 8/1981 |
| GB | 2016181 | 9/1979 |
| GB | 2062310 | 5/1981 |
| GB | 2263002 | 7/1993 |
| GB | 2365636 | 2/2002 |
| GB | 2365637 | 2/2002 |
| WO | WO-99/22292 | 5/1999 |
| WO | WO-02/12995 | 2/2002 |

OTHER PUBLICATIONS

Song, Paul J., et al., "Circuit and Architecture Trade-offs for High-Speed Multiplication", *IEEE Journal of Solid-State Circuits*, vol. 26, No. 9, (Sep. 1991), 1184-1198.

Booth, Andrew , "A Signed Binary Multiplication Technique", *Oxford University Press, Reprinted from Q.J. Mech. Appl. Math.* 4:236-240, (1951),pp. 100-104.

Dadda, L. , "On Parallel Digital Multipliers", *Associazione Elettrontecnia ed Elettronica Italiana, Reprinted from Alta Freq.* 45:574-580, (1976),pp. 126-132.

Dadda, L. , "Some Schemes for Parallel Multipliers", *Assocciazione Elettrotenica ed Elettronica Italiana, Reprinted from Alta Freq.* 34:349-356, (1965),pp. 118-125.

Fleisher, H. , "Combinatorial Techniques for Performing Arithmetic and Logical Operations", *IBM Research Center, RC-289, Research Report*, (Jul. 18, 1960),1-20.

Foster, Caxton , "Counting Responders in an Associative Memory", *The Institute of Electrical and Electronics Engineers, Inc., Reprinted, with permission, from IEEE Trans. Comput. C-20*:1580-1583, (1971),pp. 86-89.

Ho, Irving , et al., "Multiple Addition by Residue Threshold Functions and Their Representation by Array Logic", *The Institute of Electrical and Electronics Engineers, Inc., Trans. Comput. C-22*:762-767, (1973);80-85.

Jones, Rober , et al., "Parallel Counter Implementation", *Conf. Rec. 26th Asilomar Conf. Signals, Systems*, vol. 1, ISBN 0-8186-3160-0,(1992),381-385.

Swartzlander, Earl , "Parallel Counters", *Institute of Electrical and Electronic Engineers, Inc., Reprinted, with permission from IEEE Trans. Comput. C-22*:1021-1024, (1973),pp. 90-93.

Wallace, C. , "A Suggestion for a Fast Multiplier", *The Institute of Electrical and Electronics Engineers, Inc., Reprinted, with permission, from IEEE Trans. Electron. Comput. EC-13*:14-17, (1964),114-117.

Booth, Andrew, "A Signed Binary Multiplication Technique", *Oxford University Press*, Reprinted from Q.J. Mech. Appl. Math. 4:236-240,(1951), pp. 100-104.

Chakraborty,S., et al., "Synthesis of Symmetric Functions for Path-Delay Fault Testability," *12th International Conference on VLSI Design*, (1999), pp. 512-517.

Dadda, L. , "On Parallel Digital Multipliers", *Associazione Elettrontecnia ed Elettronica Italiana*, Reprinted from Alta Freq. 45:574-580,(1976), pp. 126-132.

Dadda, L., "Some Schemes For Parallel Multipliers", *Assocciazione Elettrotenica ed Elettronica Italiana*, Reprinted from Alta Freq. 34:349-356,(1965), pp. 118-125.

Debnath, D., "Minimization of And-Or-Exor Three-Level Networks with And Gate Sharing", *IEICE Trans. Inf. & Syst., E80-D*, 10, (1997), pp. 1001-1008.

Drechsler, R., et al., "Sympathy: Fast Exact Minimization of Fixed Polarity Reed-Muller Expressions for Symmetric Functions", *IEEE*, (1995), pp. 91-97.

Drechsler, R., et al., "Sympathy: Fast Exact Minimization of Fixed Polarity Reed-Muller Expressions for Symmetric Functions", *IEEE Transactions on Computer-Aided Design of Integrated Circuits and Systems*, 16(1), (1997), pp. 1-5.

Fleisher, H , "Combinatorial Techniques for Performing Arithmetic and Logical Operations", *IBM Research Center, RC-289, Research Report*, (Jul. 18, 1960), 22 pages.

Foster, Caxton, et al., "Counting Responders in an Associative Memory", *The Institute of Electrical and Electronics Engineers, Inc.*, Reprinted, with permission, from IEEE Trans. Comput. C-20:1580-1583,(1971), pp. 86-89.

Goto, et al., "A 54×54-b Regularly Structured Tree Multiplier", *IEEE Journal of Solid-State Circuits*, vol. 27, No. 9, (Sep. 1992), pp. 1229-1236.

Hekstra, et al., "A Fast Parallel Multiplier Architecture", *IEEE International Symposium on Circuits and Systems; Institute of Electrical and Electronic Engineers, c1977-c1996, 20v. :ill. :28cm*, (1992), pp. 2128-2131.

Bedrij, O. J., "Carry-Select Adder", *IRE Trans., EC-11*, (Jun. 1962), 340-346.

Knowles, S., "A Family of Adders", *Proc. 14th IEEE Symp. on Computer Arithmetic*, (1999), 30-34.

Kogge, P. M., et al., "A Parallel Algorithm for the Efficient Solution of a General Class of Recurrence Equations", *IEEE Trans. Computers*, vol. C-22, No. 8, (Aug. 1973), 786-793.

Ladner, Richard E., et al., "Parallel Prefix Computation", *Journal of ACM*, vol. 27, No. 4, (Oct. 1980), 831-838.

Ling, Huey, "High-Speed Binary Adder", *IBM Journal of Research and Development*, vol. 25, No. 3, (1981), 156-166.

Nicholson, J. O., "Parallel-Carry Adders Listing Two-Bit Covers", *IBM Technical Disclosure Bulletin*, (22(11), (Apr. 1980), 5036-5037.

Ong, S., et al., "A Comparision of ALU Structures for VLSI Technology", *Proceedings, 6th Symposium on Computer Arithmetic (IEEE)*, (1983),10-16.

Schmookler, M. S., et al., "Group-Carry Generator", *IBM Technical Disclosure Bulletin*, 6(1), (Jun. 1963), 77-78.

Sklansky, J., "Conditional-Sum Addition Logic", *IRE Trans., EC-9*, (Jun. 1960), 226-231.

Weinberger, A., et al., "A Logic for High-Speed Addition", *Nat. Bur. Stand. Circ.*, 591, (1958), 3-12.

Weinberger, A., "Extension of the Size of Group Carry Signals", *IBM Technical Disclosure Bulletin*, 22(4), (Sep. 1979), 1548-1550.

Weinberger, A., "Improved Carry-Look-Ahead", *IBM Technical Disclosure Bulletin*, 21(6), (Nov. 1978), 2460-2461.

Ho, I., et al., "Multiple Addition by Residue Threshold Functions and Their Representation By Array Logic", *The Institute of Elec-*

*trical and Electronics Engineers, Inc., Reprinted, with permission from IEEE Trans. Comput. C-22*: 762-767, (1973), pp. 80-85.

Jones, Jr., R., et al., "Parallel Counter Implementation", *IEEE*, (1992), pp. 381-385.

Nienhaus, H., "Efficient Multiplexer Realizations of Symmetric Functions", *IEEE*, (1981), pp. 522-525.

Oklobdzija, V G., et al., "Improving multiplier design by using improved column compression tree and optimized final adder in CMOS technology", *IEEE transactions on Very Large Scale Integration (VLSI) Systems*, IEEE, Inc, New York, vol. 3, No. 2, (1995), pp. 292-301.

Swartzlander, Jr., Earle, "Parallel Counters", *Institute of Electrical and Electronic Engineers, Inc., Reprinted, with permission from IEEE Trans. Comput. C-22*:1021-1024, (1973), pp. 90-93.

Vassiliadis, S., et al., "7/2 Counters and Multiplication with Threshold Logic", *IEEE*, (1997), pp. 192-196.

Wallace, C., "A Suggestion for a Fast Multiplier", *IEEE Transactions on Electronic Computers*, vol. EC-13, (1964), pp. 14-17.

Zuras, D, et al., "Balanced delay trees and combinatorial division in VLSI", *IEEE Journal of Solid State Circuits, SC-21*, IEEE Inc, New York, vol. SC-21, No. 5, (1986), pp. 814-819.

PRIOR ART

MULTIPLICATION LOGIC CIRCUIT

CROSS-REFERENCE TO RELATED APPLICATIONS

This application claims the benefit of priority under 35 U.S.C. §§ 365(c) and 120 to International Application Number PCT/GB02/01343 filed Mar. 21, 2002 and published in English as WO 02/077792 A2, which application and publication are incorporated herein by reference. The present application, a nationalization of PCT/GB02/01343, is a continuation-in-part of U.S. patent application Ser. No. 09/898,752, filed on Jul. 3, 2001, now issued as U.S. Pat. No. 7,139,788, which claims priority benefits under 35 U.S.C. §119 to Great Britain application no. 0107212.3, filed Mar. 22, 2001.

The present invention generally relates to digital electronic devices and more particularly to a multiplication logic circuit for multiplying two binary numbers and a multiply-accumulate logic circuit for multiplying and accumulating previous multiplications.

It is instrumental for many applications to have a block that adds n inputs together. An output of this block is a binary representation of the number of high inputs. Such blocks, called parallel counters (L. Dadda, *Some Schemes for Parallel Multipliers*, Alta Freq 34: 349-356 (1965); E. E. Swartlander Jr., *Parallel Counters*, IEEE Trans. Comput C-22: 1021-1024 (1973)), are used in circuits performing binary multiplication. There are other applications of a parallel counter, for instance, majority-voting decoders or RSA encoders and decoders. It is important to have an implementation of a parallel counter that achieves a maximal speed. It is known to use parallel counters in multiplication (L. Dadda, *On Parallel Digital Multipliers*, Alta Freq 45: 574-580 (1976)).

A full adder is a special parallel counter with a three-bit input and a two-bit output. A current implementation of higher parallel counters i.e. with a bigger number of inputs is based on using full adders (C. C. Foster and F. D. Stockton, *Counting Responders in an Associative Memory*, IEEE Trans. Comput C-20: 1580-1583 (1971)). In general, the least significant bit of an output is the fastest bit to produce in such implementation while other bits are usually slower.

The following notation is used for logical operations:
- $\oplus$—Exclusive OR;
- $\vee$—OR;
- $\wedge$—AND;
- $\neg$—NOT.

An efficient prior art design (Foster and Stockton) of a parallel counter uses full adders. A full adder, denoted FA, is a three-bit input parallel counter shown in FIG. 1. It has three inputs $X_1$, $X_2$, $X_3$, and two outputs S and C. Logical expressions for outputs are $$S = X_1 \oplus X_2 \oplus X_3,$$

$$C = (X_1 \wedge X_2) \vee (X_1 \wedge X_3) \vee (X_2 \wedge X_3).$$

A half adder, denoted HA, is a two bit input parallel counter shown in FIG. 1. It has two inputs $X_1$, $X_2$ and two outputs S and C. Logical expressions for outputs are $$S = X_1 \oplus X_2,$$

$$C = X_1 \wedge X_2.$$

A prior art implementation of a seven-bit input parallel counter illustrated in FIG. 2.

Multiplication is a fundamental operation Given two n-digit binary numbers $$A_{n-1}2^{n-1} + A_{n-2}2^{n-2} + \ldots + A_1 2 + A_0 \text{ and } B_{n-1}2^{n-1} + B_{n-2}2^{n-2} + \ldots + B_1 2 + B_0,$$

their product $$P_{2n-1}2^{2n-1} + P_{2n-2}2^{2n-2} + \ldots + P_1 2 + P_0$$

may have up to 2n digits. Wallace has invented the first architecture for a multiplier, now called the Wallace-tree multiplier (Wallace, C. S., *A Suggestion for a Fast Multiplier*, IEEE Trans. Electron. Comput. EC-13: 14-17 (1964)). Dadda has investigated bit behaviour in a multiplier (L. Dadda, *Some Schemes for Parallel Multipliers*, Alta Freq 34: 349-356 (1965)). He has constructed a variety of multipliers and most multipliers follow Dadda's scheme.

Dadda's multiplier uses the scheme in on FIG. 3. If inputs have 8 bits then 64 parallel AND gates generate an array shown in FIG 4. The AND gate sign $\wedge$ is omitted for clarity so that $A_i \wedge B_j$ becomes $A_i B_j$. The rest of FIG. 4 illustrates array reduction that involves full adders (FA) and half adders (HA). Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of the fast addition schemes, for instance, conditional adder or carry-look-ahead adder.

UK patent application numbers 0019287.2 and 0101961.1, U.S. patent application Ser. No. 09/637,532 (now U.S. Pat. No. 6,938,061), Ser. No. 09/769,954 (now U.S. Pat. No. 6,883,011). and Ser. No. 09/917,257 (now U.S. Pat. No. 7,136,888). and International patent application numbers GB01/03415 and GB01/04455, the contents of all of which are hereby incorporated by reference, disclose a technique for the modification or deformation of the array prior to array reduction. The array deformation derives the benefit of reducing the depth of the array to a number greater than $2^{n-1}-1$ and less than or equal to $2^n-1$, where n is an integer. This reduction of the maximum depth of the array enables the efficient use of parallel counters in the array reduction step.

It is an object of the present invention to provide an improved multiplication logic circuit and an improved multiply-accumulate logic circuit in which the speed of operation of the logic circuit is improved.

The present inventors have realised that in the array reduction step the use of maximal length parallel counters can significantly reduce wiring delays present in the prior art array reduction logic. The inventors have also however realised that the outputs of the maximum length parallel counters experience different gate delays. Thus in accordance with the present invention, in addition to the use of maximal length parallel counters in the array reduction step, the outputs of the maximal length parallel counters are input to reduction logic circuits with asymmetric delays to ameliorate the effects of the differential delays of the output of the parallel counter circuits.

Thus in accordance with the present invention, outputs generated from the maximal length parallel counter logic that experience shorter delays are input to reduction logic inputs which incur longer delays in the generation of the output Outputs of the maximal length parallel counter logic that experiences longer delays with the parallel counter logic are input to inputs of the asymmetric reduction logic which experience shorter delays in the generation of the output.

Thus in this way the overall delays through the parallel counter logic and the further reduction logic are balanced and the differences in delays through the parallel counter logic is compensated for by the further reduction logic.

In accordance with the present invention, at least one maximal parallel counter is used in the array reduction step to reduce the array in one dimension by receiving all of the values in the array in one column In an embodiment of the present invention the array is modified by undergoing the array deformation as disclosed in copending UK applications numbers 0019287.2 and 0101961.1, U.S. patent application Ser. No. 09/637,532 (now U.S. Pat. No. 6,938,061), Ser. No. 09/769,954 (now U.S. Pat. No. 6,883,011). and Ser. No. 09/917,257 (now U.S. Pat. No. 7,136,888). and International patent application numbers GB01/03415 and GB01/04455. Array deformation provides the benefit of reducing the number of inputs for a maximal column to a number greater than $2^{n-1}-1$ and less than or equal to $2^{n-1}$, where n is an integer. For example, for the multiplication of two 16 bit numbers, the array deformation process reduces the maximal depth of the array to 15 bits in any given column thereby enabling 15 bit input, 4 bit output parallel counters to be used in the first reduction step to reduce the array depth to a maximum of 4 bits. For a 32 bit input, the array deformation step reduces the maximal height of the array to 31 bits in any given column thereby enabling a 31 bit input, 5 output parallel counter to be used to provide an array of reduced depth which is a maximum of 5 bits.

In an embodiment of the present invention, the reduction logic with asymmetric delays comprises any combination of fill adders, half adders and 4 to 2 compressors. Where a number of outputs from the parallel counters is 4 or more, 4 to 2 compressors are preferably used to generate to 2 bit outputs.

Embodiments of the present invention will now be described with reference to the accompanying drawings, in which.

Figure 1:
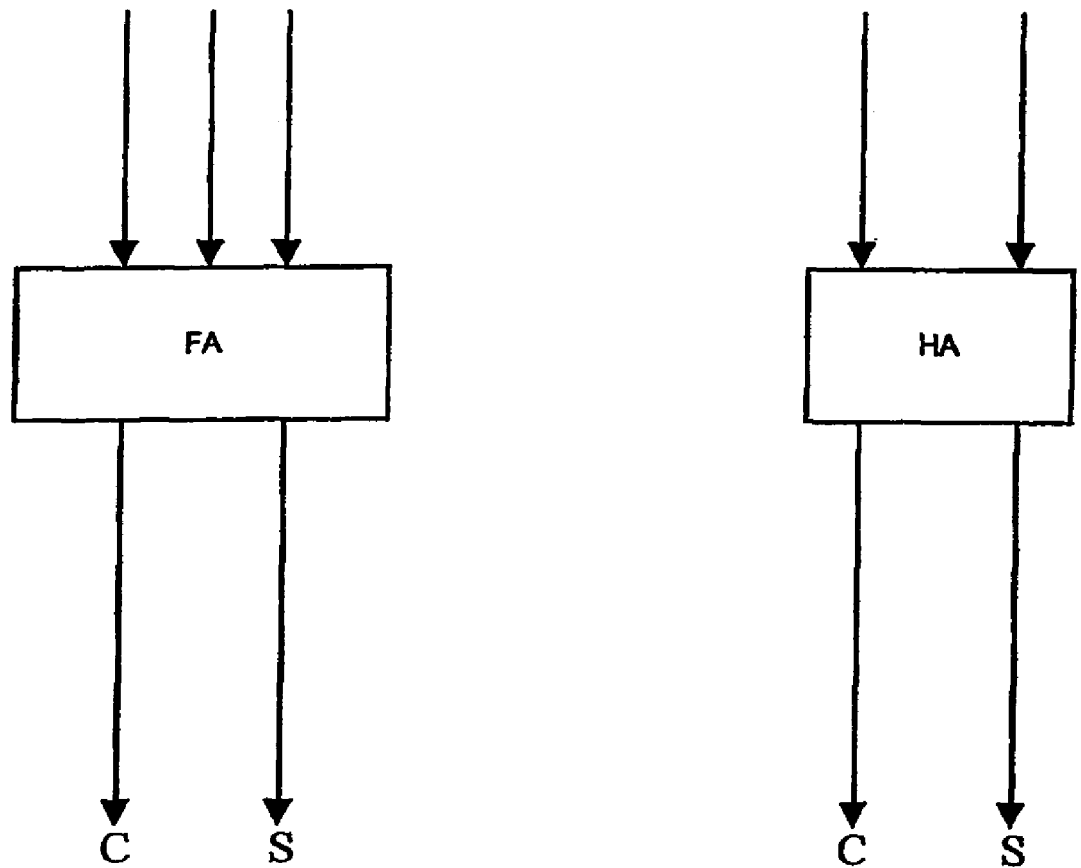
FIG. 1 is a schematic diagram of a full adder and a half adder in accordance with the prior art.
Figure 2:
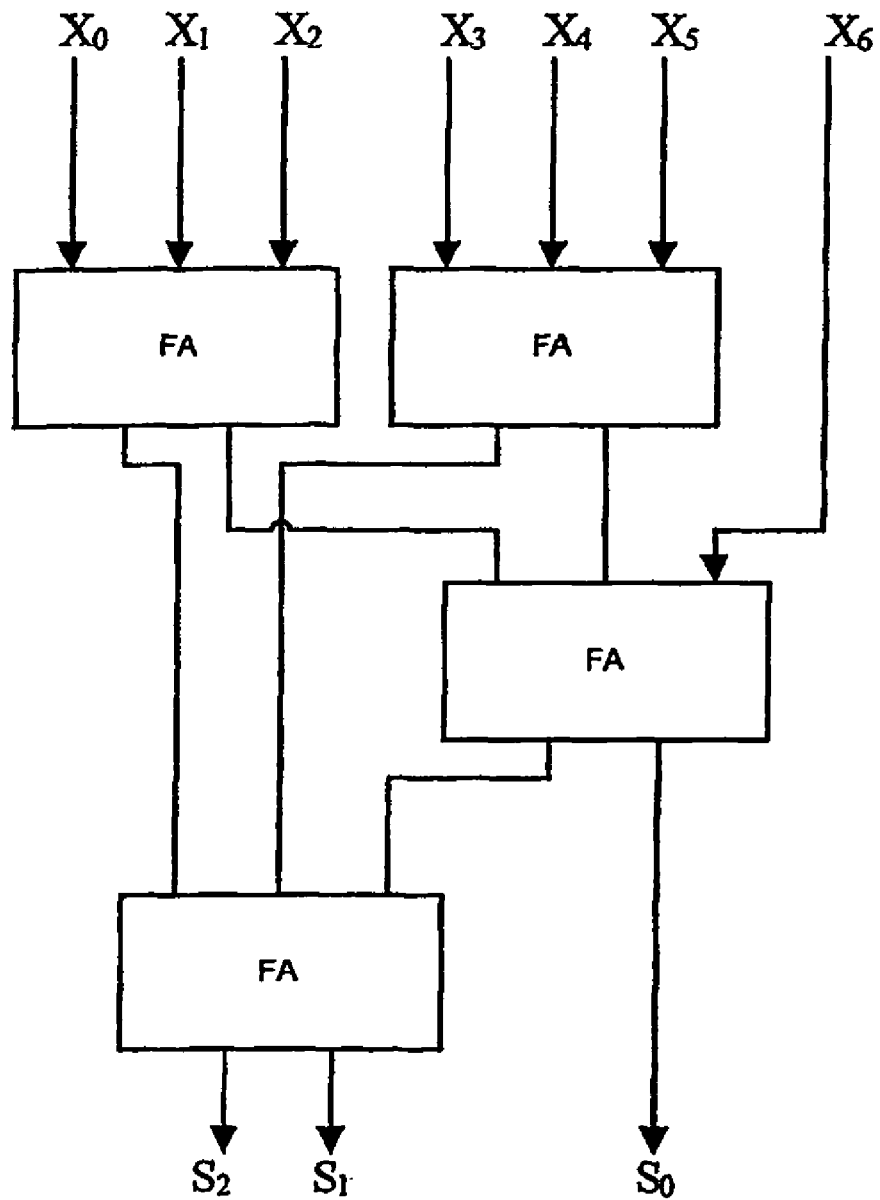
FIG. 2 is a schematic diagram of a parallel counter using full adders in accordance with the prior art.
Figure 3:
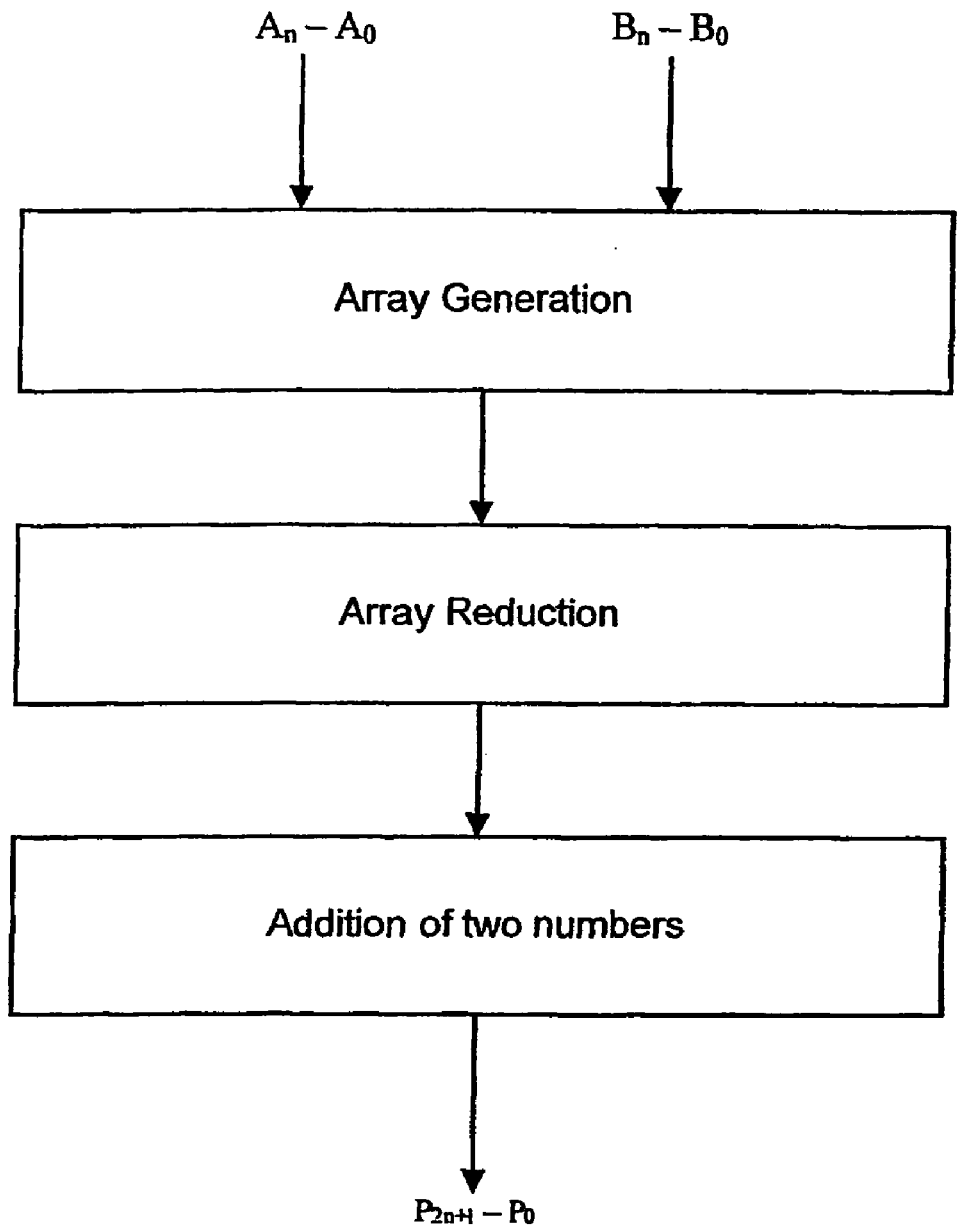
FIG. 3 is a diagram of the steps used in the prior art for multiplication.
Figure 4:
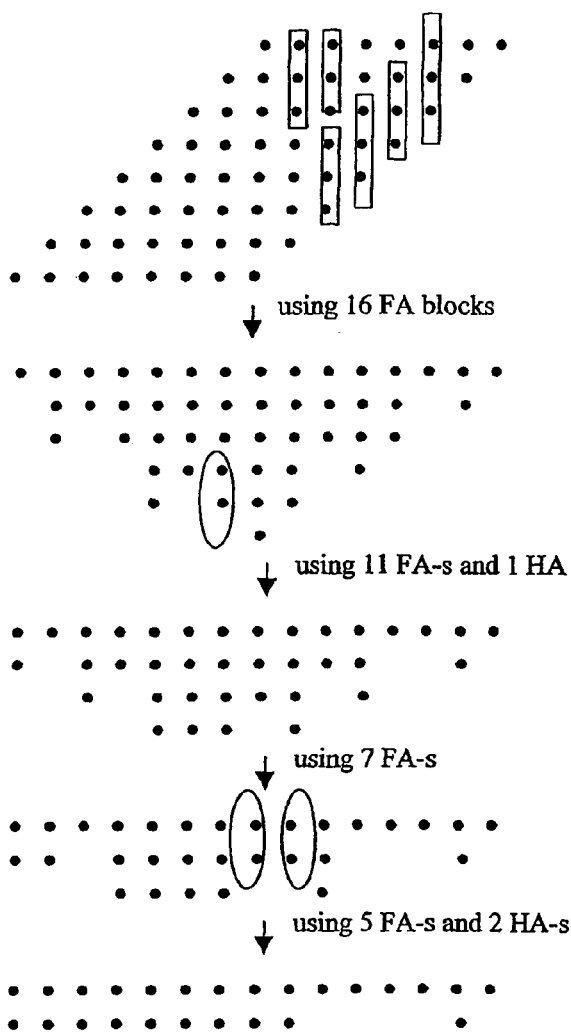
FIG. 4 is a diagram of the process of FIG. 3 in more detail.
Figure 5:
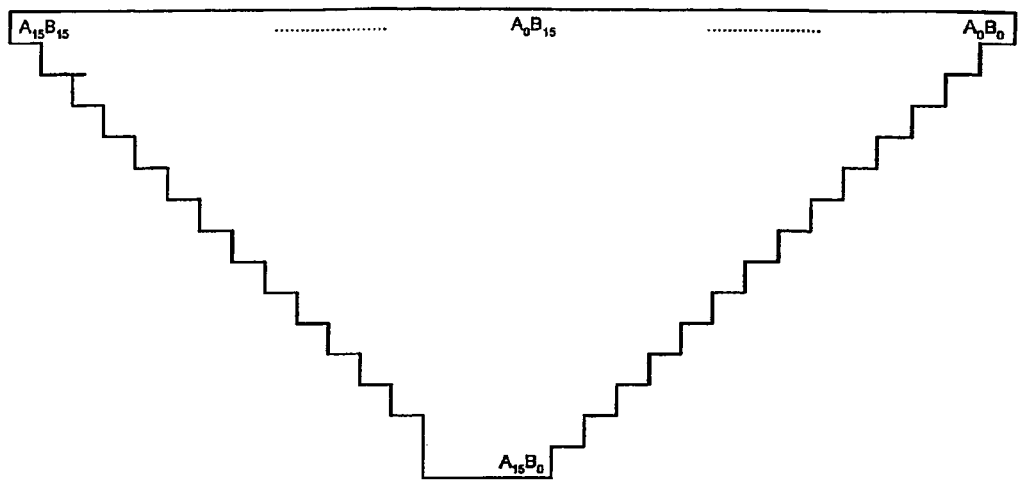
FIG. 5 is a schematic diagram illustrating the structure of a generated deformed array in accordance with an embodiment of the present invention.
Figure 6:
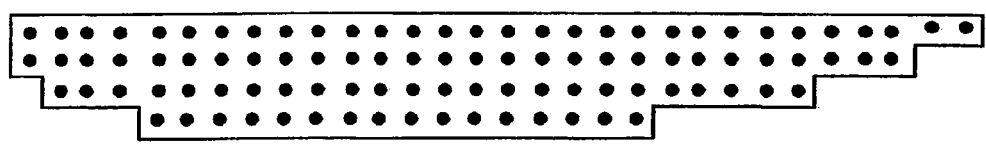
FIG. 6 is a schematic diagram illustrating the array after reduction by maximal length parallel counters in accordance with an embodiment of the present invention.

In the embodiment illustrated in FIG. 5, the array generated in the process for multiplying two 16 bit binary numbers A and B is formed as a deformed array in accordance with the process disclosed in copending UK patent applications numbers 0019287.2 and 0101961.1, U.S. patent application Ser. No. 09/637,532(now U.S. Pat. No. 6,938,061), Ser. No. 09/769,954 (now U.S. Pat. No. 6,883,011), and Ser. No. 09/917,257 (now U.S. Pat. No. 7,136,888), and International patent application numbers GB01/03415 and GB01/04455, the contents of which are hereby incorporated by reference. The advantage of this array over the array of the prior art as illustrated in FIG. 4 is that the maximum number of bits in a column is smaller. In the prior art, for a 16 bit multiplication, a column will have 16 bits. The array of FIG. 5 has four columns with 15 bit The first reduction step to reduce the array comprises the use of parallel counters to reduce each column from a maximum of 15 bits to 4 bits maximum as illustrated in FIG. 6. Any conventional parallel counters can be used for reducing the maximal columns of 15 bits to 4 bits, although it is preferable to use the parallel counters disclosed in the copending applications identified above.

The 4 bits output from the parallel counters will have experienced different gate delays. Typically 2 outputs experience 4 gate delays and 2 outputs experience 5 gate delays. However, the use of a single logic circuit in the form of a maximal length parallel counter for the reduction of the array greatly reduces the wiring between circuits. There is thus a significant wiring benefit in using maximal length parallel counters.

Figure 7:
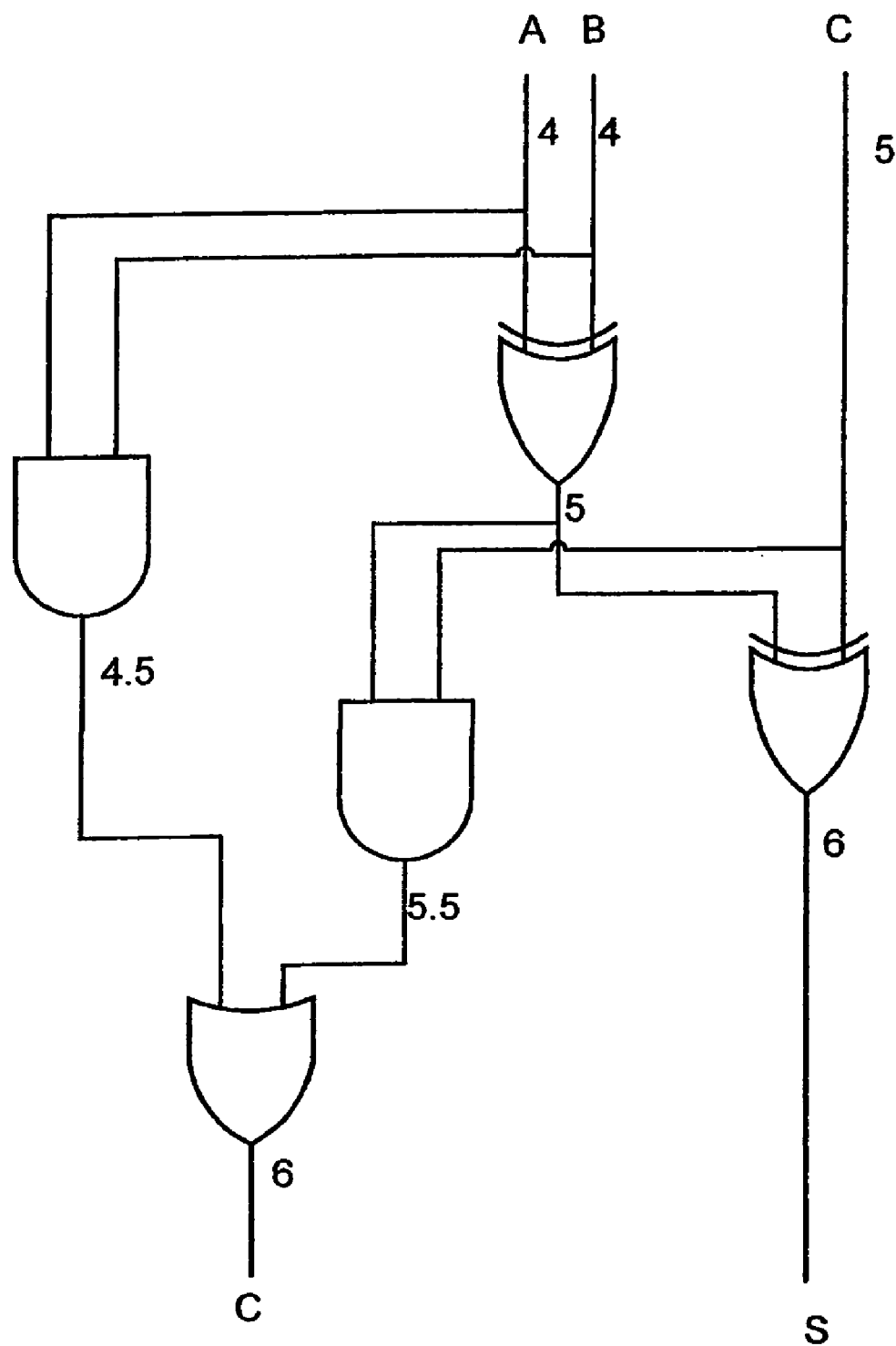
FIG. 7 is a diagram of the logic of a full adder showing the gate delays.

FIG. 7 is a logic diagram of a full adder that illustrates the asymmetric nature of the circuit. Inputs A and B can comprise outputs from a maximal length parallel counter which have experience 4 gate delays and are therefore relatively advanced compared to the input to the circuit C which is an output from the maximal length parallel counter which has experienced 5 gate delays. Each gate delay in this example is expressed as an EXOR gate delay which is the slowest gate. And and OR gates are considered to have a relative delay of 0.5. FIG. 7 illustrates the cumulate gate delay and as can be seen, the sum S is output with a cumulative gate delay of 6 and a carry C is also output with a cumulative gate delay of 6. Thus the fill adder can be used as part of the second level of array reduction in order to compensate for the relative gate delays of the outputs of the maximal length parallel counters in the first level of array reduction.

Figure 8:
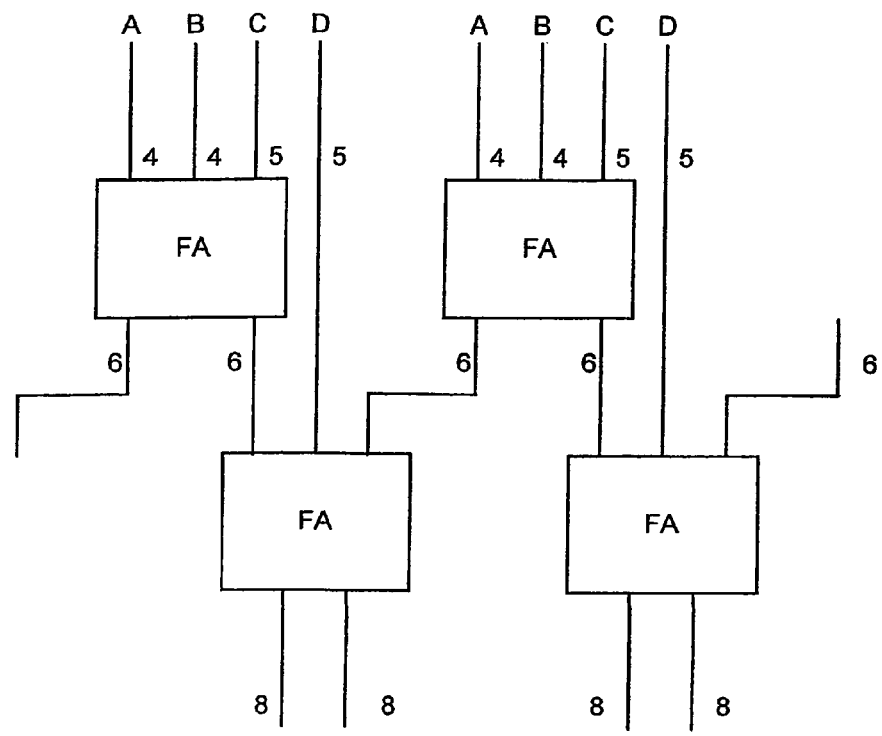
FIG. 8 is a schematic diagram of a 4 to 2 compressor constructed from full adders in accordance with an embodiment of the present invention.

FIG. 8 is a schematic logic diagram of two adjacent 4 to 2 compressors each comprised of 2 full adders. The relative gate delays are illustrated to illustrate the asymmetric nature of the logic used as a second level of logic reduction in this embodiment of the present invention.

Figure 9:
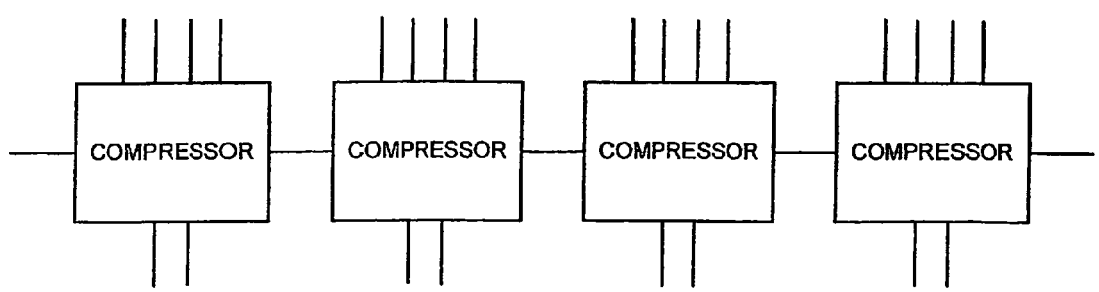
FIG. 9 is a schematic diagram of the logic circuit for the second stage of the array reduction using 4 to 2 compressors in accordance with an embodiment of the present invention.

FIG. 9 illustrates a chain of 4 to 2 compressors used to receive each of 4 columns of bits from the reduced array following the first level of reduction by the maximal length parallel counters. The output of the 4 to 2 compressors for each column comprises 2 bits. The 2 bits can then be added using conventional addition logic circuitry to generate the output binary number comprising a multiplication of the 2 n bit binary numbers.

Figure 10:
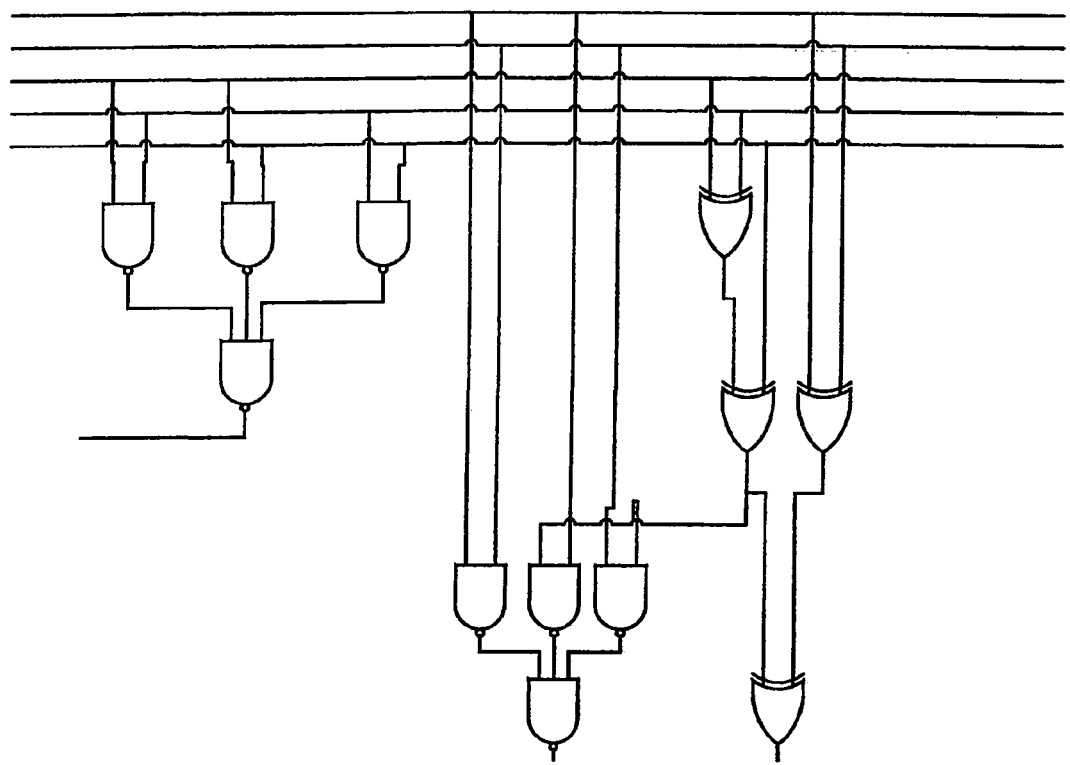
FIG. 10 is a diagram of the logic of a 4 to 2 compressor.

FIG. 10 is a logic diagram of the 4 to 2 compressor in accordance with an embodiment of the present invention.

Thus in this embodiment of the present invention an array is generated and modified by array deformation in accordance with the applicant's earlier inventive array modification technique. The array is reduced in two stages. The first stage is built upon the recognition that the wiring of the multiplication logic circuit can be reduced if a single parallel counter is used for the reduction of each column of the array. This however results in outputs which have suffered differential gate delays. Thus the invention ameliorates this problem by using a second level of array reduction which uses logic circuits for which the inputs experience relative differential gate delays i.e., the logic circuit imposes asymmetric delays on the inputs. In this way the relative delays caused by the use of the maximal length parallel counters does not cause a delay in the further reduction step.

Thus this multiplication logic circuit is highly efficient since it has reduced wiring and increase speed because of the balancing of the gate delays in the logic circuit.

Although the present invention has been described hereinabove with reference to a specific embodiment, it will be apparent to a skilled person in the art that modifications lie within the spirit and scope of the present invention.

For example, although the present invention has been described hereinabove with reference to a specific example in which the array is deformed before army reduction, the present invention is applicable to the reduction of an undeformed array. For example, the array can be generated using any prior art technique. Any logic gate operation for performing a logical combination of the bits can be used to form the array such as AND, NAND, OR or NOR gates. Further the array can be generated by the use of Booth encoding.

In the present invention any prior art parallel counter logic circuit can be used for the first level of the array reduction. Parallel counters can be used for any number of the columns that need not be used for all columns. For example, for the columns with three bits, a full adder can be used. It may also be desirable for some columns to use full adders rather than the parallel counter. The number of columns reduced by the use of parallel counters is a design choice. It is however envisaged that it is preferable to use parallel counters for any columns having more than 3 bits in the array.

In accordance with the present invention, the second array reduction step can be implemented by any suitable logic for which there are differential delays experienced by the inputs in the generation of the outputs.

Although in the present invention any form of parallel counter can be used, in a preferred embodiment, the parallel counters disclosed in UK patent applications numbers 0019287.2 and 0101961.1, U.S. patent application Ser. Nos. 09/637,532, 09/759,954 and 09/917,257 and International patent application numbers GB01/03415 and GB01/04455 are used.

In the present invention any conventional method can be used for the final step of addition of the two binary numbers in order to generate the output of the multiplication logic circuit.

Although the present invention has been described with reference to a specific multiplication logic circuit the present invention also applies to any logic circuit that performs multiplication including a multiply-accumulate logic circuit (which can be viewed as a special case of a multiplication logic circuit). In a multiply-accumulate logic circuit the operation A×B+C is implemented where C is the accumulation of previous multiplications. The multiply-accumulate logic circuit operates by generating the array of A×B as described hereinabove for the multiplication logic circuit. An additional row is added in the array for the bits of C. C can have many more bits than A or B due to previous accumulations. This enlarged array then undergoes array reduction as described hereinabove.

The present invention encompasses any method of designing and manufacturing the inventive multiplication logic circuit as hereinabove described. The present invention further encompasses code or data characterizing the inventive multiplication logic circuit Also the present invention encompasses code for modelling the inventive functionality of the multiplication logic circuit as described hereinabove.

It is well known in the field that logic circuits can be designed on computer systems using code executed to model the functionality of the logic circuit. The result of such a design procedure is code defining the features and functionality of the logic. Thus, code defining the characteristics or functions of the logic circuit can be made available to logic designers and builders. The code for designing and the code for defining the characteristics or functions of the logic circuit can be made available on any suitable carrier medium such as a storage medium, e.g. a floppy disk, hard disk, CD-ROM, tape device, or solid state memory device, or a transient medium such as any type of signal, e.g. an electrical signal, optical signal microwave signal, acoustic signal, or magnetic signal (e.g. a signal carried over a communications network).

A logic circuit manufacturer can thus be provided with code defining the characteristics or functions of the standard cells and this code can be used for the manufacture of a logic circuit in semiconductor material using known manufacturing techniques.

In one embodiment of the present invention, the design process encompasses the use of standard cells using a standard cell design process. A designer can implement a design program in order to design standard cells which implement either the complete logic function or parts of the multiplication logic circuit. The design process involves designing, building and testing the standard cells in silicon and the formation of a library of data characterizing the standard cells which have been successfully tested. This library of data characterizing standard cell designs contains information which can be used in the design of a logic circuit using the standard cells. The data or code in the library thus holds characteristics for the logic circuit which defines a model of the standard cell. The data can include geometry, power and timing information as well as a model of the function performed by the standard cell. Thus a vendor of standard cell designs can make the library of standard cell code available to logic circuit designers to facilitate the design of logic circuits to perform specific functions using the functionality of the library of standard cells. A logic circuit designer can use the library of code for standard cells in a computer modelling implementation to assemble a logic circuit, i.e. the multiplication logic circuit using the standard cell code. The designer therefore implements a design application which uses the code to build the model of the desired logic circuit The resultant data defines the characteristics of the logic circuit, i.e. the multiplication logic circuit, in terms of a combination of standard cells. This data can thus be used by a chip manufacturer to design and build the chip using the model data generated by the logic circuit designer.

The present invention encompasses the design of standard cells for implementing the functions in accordance with the present invention, i.e. the generation of model data defining the characteristics of standard cells implementing the inventive functions. The present invention also encompasses the method of designing the inventive multiplication logic circuit using the library of standard cell data, i.e. the steps of using a computer program to generate data modelling the characteristics of the inventive multiplication logic circuit. The invention also encompasses the process of manufacturing the multiplication logic circuit using the design data.

Although the present invention has been described hereinabove with reference to specific embodiments, it will be apparent to a skilled person in the art that modifications lie within the spirit and scope of the present invention.

The invention claimed is:

1. A multiplication logic circuit for multiplying two binary numbers, the circuit comprising:
   array generation logic for generating, from the two binary numbers, an array of binary values which are required to be added;
   array reduction logic for reducing the depth of the array to two binary numbers; and
   addition logic for adding the binary values of the binary numbers;
   wherein the array reduction logic comprises:
   first array reduction logic comprising a plurality of binary counters, each for receiving the binary values of all binary numbers in a respective column of the array, and for outputting binary numbers; and
   second array reduction logic having logic imposing asymmetric delays on inputs to the logic and for receiving the binary numbers output from the parallel counters at the inputs and for outputting said binary numbers to said addition logic.

2. A multiplication logic circuit according to claim 1, wherein said first array reduction logic includes adder logic for adding binary values of binary numbers in respective columns.

3. A multiplication logic circuit according to claim 2, wherein said adder logic comprises at least one full adder.

4. A multiplication logic circuit according to claim 2, wherein said adder logic is arranged to add binary values of binary numbers for columns in said array having 3 or less bits.

5. A multiplication logic circuit according to claim 4, wherein said second array reduction logic comprises any one of or combination of a full adder, a half adder, and four to two compressor logic.

6. A multiplication logic circuit according to claim 5, wherein said array generation logic is arranged to perform a logical combination between each bit in one binary number and each bit in the other binary number to generate the array of binary values as an array of logical combinations.

7. A multiplication logic circuit according to claim 6, wherein said array generation logic is arranged to perform the logical AND operation between each bit in one binary number and each bit in the other binary number to generate the array of binary values as an array of logical AND combinations.

8. A multiply-accumulate logic circuit comprising the multiplication logic circuit according to any one of claims 1-7, wherein said array generation logic is arranged to include an accumulation of previous multiplications.

9. An integrated circuit including the logic circuit according to any one of claims 1-7.

10. A digital electronic device including the logic circuit according to any one of claims 1-7.

11. A method of manufacturing the multiplication logic circuit according to any one of claims 1 to 7, comprising designing and building the multiplication logic circuit in semiconductor material in accordance with code defining characteristics of the multiplication logic circuit.

12. A multiplication logic circuit according to claim 1, wherein said second array reduction logic comprises any one of or combination of a full adder, a half adder, and four to two compressor logic.

13. A multiplication logic circuit according to claim 1, wherein said array generation logic is arranged to perform a logical combination between each bit in one binary number and each bit in the other binary number to generate the array of binary values as an array of logical combinations.

14. A multiplication logic circuit according to claim 2, wherein said array generation logic is arranged to perform a logical combination between each bit in one binary number and each bit in the other binary number to generate the array of binary values as an array of logical combinations.

15. A multiplication logic circuit according to claim 2, wherein said second array reduction logic comprises any one of or combination of a full adder, a half adder, and four to two compressor logic.

16. A multiplication logic circuit according to claim 4, wherein said array generation logic is arranged to perform a logical combination between each bit in one binary number and each bit in the other binary number to generate the array of binary values as an array of logical combinations.

17. A multiplication logic circuit according to claim 3, wherein said array generation logic is arranged to perform a logical combination between each bit in one binary number and each bit in the other binary number to generate the array of binary values as an array of logical combinations.

18. A multiplication logic circuit according to claim 3, wherein said second array reduction logic comprises any one of or combination of a full adder, a half adder, and four to two compressor logic.

19. A multiplication logic circuit according to claim 3, wherein said adder logic is arranged to add binary values of binary numbers for columns in said array having 3 or less bits.

20. A multiplication logic circuit according to claim 19, wherein said second array reduction logic comprises any one of or combination of a full adder, a half adder, and four to two compressor logic.

21. An integrated circuit including the logic circuit according to any one of claims 19-16.

22. A digital electronic device including the logic circuit according to any one of claims 19-16.

23. A method of manufacturing the multiplication logic circuit according to any one of claims 19 to 16, comprising designing and building the multiplication logic circuit in semiconductor material in accordance with code defining characteristics of the multiplication logic circuit.

* * * * *